(12) United States Patent
Shirai

(10) Patent No.: US 9,411,984 B2
(45) Date of Patent: Aug. 9, 2016

(54) CRYPTOGRAPHIC PROCESSING APPARATUS, CRYPTOGRAPHIC PROCESSING SYSTEM, AND CRYPTOGRAPHIC PROCESSING METHOD

(71) Applicant: Tatsuhiro Shirai, Takatsuki (JP)

(72) Inventor: Tatsuhiro Shirai, Takatsuki (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 14/508,058

(22) Filed: Oct. 7, 2014

(65) Prior Publication Data

US 2015/0310230 A1  Oct. 29, 2015

(30) Foreign Application Priority Data

Apr. 28, 2014 (JP) .................................. 2014-92865

(51) Int. Cl.
| | | |
|---|---|---|
| *H04L 29/06* | (2006.01) | |
| *G06F 21/72* | (2013.01) | |
| *H04L 9/08* | (2006.01) | |
| *G06F 21/57* | (2013.01) | |
| *G06F 21/74* | (2013.01) | |

(52) U.S. Cl.
CPC .............. *G06F 21/72* (2013.01); *G06F 21/575* (2013.01); *G06F 21/74* (2013.01); *H04L 9/0894* (2013.01)

(58) Field of Classification Search
CPC . G06F 21/72; G06F 21/575; G06F 2221/034; H04L 9/0894
USPC .......................................................... 713/189
See application file for complete search history.

(56) References Cited

U.S. PATENT DOCUMENTS

| | | | | |
|---|---|---|---|---|
| 5,237,611 | A * | 8/1993 | Rasmussen ........... | H04L 9/0822 380/243 |
| 6,700,964 | B2 * | 3/2004 | Schmid ............... | H04L 12/4633 379/189 |
| 6,711,264 | B1 * | 3/2004 | Matsumoto ........... | H04L 9/0891 380/277 |
| 6,965,675 | B1 * | 11/2005 | Trimberger ............. | G06F 21/76 380/277 |
| 7,065,642 | B2 * | 6/2006 | Sandhu ................... | H04L 9/321 380/279 |
| 7,134,025 | B1 * | 11/2006 | Trimberger ......... | G06F 12/1425 711/154 |
| 2001/0033583 | A1 * | 10/2001 | Rabenko .................. | H04B 3/23 370/503 |
| 2002/0042880 | A1 * | 4/2002 | Endoh ..................... | G06F 21/84 713/182 |
| 2002/0071553 | A1 * | 6/2002 | Shirai ................... | H04L 9/0637 380/42 |
| 2002/0080960 | A1 * | 6/2002 | Kanayama ....... | G11B 20/00086 380/201 |
| 2003/0178482 | A1 * | 9/2003 | Kisliakov ............. | G06F 9/4443 235/380 |
| 2003/0209607 | A1 * | 11/2003 | Kisliakov ............... | G06K 19/06 235/492 |

(Continued)

FOREIGN PATENT DOCUMENTS

JP 2012-165289 8/2012

OTHER PUBLICATIONS

European Search Report (6 pages) dated Sep. 17, 2015, issued in corresponding EP Application No. 14187890.0.

*Primary Examiner* — David García Cervetti
(74) *Attorney, Agent, or Firm* — Nixon & Vanderhye, P.C.

(57) ABSTRACT

A process mode of either of an encryption process and a decryption process is set for at least one of a plurality of pieces of key data, in association with the key data. Then, a mode specifying command for specifying a process mode in association with key data is received from another apparatus, and if the received process mode and the process mode associated with the key data coincide with each other, the process in the process mode using the key data is permitted.

13 Claims, 6 Drawing Sheets

(56) References Cited

U.S. PATENT DOCUMENTS

| Publication No. | Date | Name | Classification | Subclass |
|---|---|---|---|---|
| 2003/0212635 A1* | 11/2003 | Kisliakov | G06K 7/0008 | 705/41 |
| 2003/0212895 A1* | 11/2003 | Kisliakov | G06K 19/07 | 713/185 |
| 2003/0212896 A1* | 11/2003 | Kisliakov | G06F 1/1626 | 713/193 |
| 2004/0039908 A1* | 2/2004 | Rose | H04L 9/0637 | 713/168 |
| 2004/0170274 A1* | 9/2004 | Machida | H04N 1/4486 | 380/46 |
| 2004/0193898 A1* | 9/2004 | Ochi | H04L 9/003 | 713/189 |
| 2005/0010763 A1* | 1/2005 | Matsui | H04L 63/0464 | 713/165 |
| 2005/0160138 A1* | 7/2005 | Ishidoshiro | H04L 63/06 | 709/203 |
| 2006/0015748 A1* | 1/2006 | Goto | G06F 21/52 | 713/190 |
| 2006/0018481 A1* | 1/2006 | Nagano | H04L 9/3271 | 380/270 |
| 2006/0026417 A1* | 2/2006 | Furusawa | G06F 21/575 | 713/2 |
| 2006/0044610 A1* | 3/2006 | Miyata | G06Q 20/382 | 358/1.15 |
| 2006/0053112 A1* | 3/2006 | Chitkara | G06F 17/30595 | |
| 2006/0056635 A1* | 3/2006 | Pappas | H04W 84/08 | 380/270 |
| 2006/0090084 A1* | 4/2006 | Buer | G06F 21/53 | 713/189 |
| 2006/0155981 A1* | 7/2006 | Mizutani | H04L 9/0822 | 713/150 |
| 2007/0016957 A1* | 1/2007 | Seaward | G06F 3/03543 | 726/26 |
| 2007/0165440 A1* | 7/2007 | Hirai | H04L 9/3273 | 365/63 |
| 2007/0266242 A1* | 11/2007 | Yamaguchi | G06F 12/1408 | 713/164 |
| 2008/0098239 A1* | 4/2008 | Wada | G11B 20/00086 | 713/193 |
| 2008/0294913 A1* | 11/2008 | Nakagoe | H04L 9/0637 | 713/193 |
| 2009/0315671 A1* | 12/2009 | Gocho | G03B 17/38 | 340/5.8 |
| 2010/0002879 A1* | 1/2010 | Risley | H04L 63/0428 | 380/255 |
| 2010/0074628 A1* | 3/2010 | Murakami | H04L 12/66 | 398/182 |
| 2010/0095115 A1* | 4/2010 | Murray | G06F 21/6227 | 713/165 |
| 2010/0111295 A1* | 5/2010 | Okada | H04L 9/0637 | 380/28 |
| 2010/0306519 A1* | 12/2010 | Buonpane | B06F 21/79 | 713/2 |
| 2011/0007901 A1* | 1/2011 | Ikeda | H04B 5/02 | 380/270 |
| 2011/0156879 A1* | 6/2011 | Matsushita | H04L 63/08 | 340/10.1 |
| 2011/0170686 A1* | 7/2011 | Goto | H04L 9/08 | 380/44 |
| 2011/0238976 A1* | 9/2011 | Shahriar | H04L 63/0435 | 713/150 |
| 2011/0246777 A1* | 10/2011 | Buckley | H04L 9/0844 | 713/172 |
| 2011/0296202 A1* | 12/2011 | Henry | G06F 12/0875 | 713/190 |
| 2012/0019674 A1* | 1/2012 | Ohnishi | G08C 17/00 | 348/207.1 |
| 2012/0137139 A1* | 5/2012 | Kudoh | H04L 9/10 | 713/189 |
| 2012/0201380 A1* | 8/2012 | Kohiyama | G06F 21/123 | 380/255 |
| 2013/0151858 A1* | 6/2013 | Wang | G06F 12/1466 | 713/182 |
| 2014/0164725 A1* | 6/2014 | Jang | G06F 21/575 | 711/163 |
| 2014/0164753 A1* | 6/2014 | Lee | G06F 21/575 | 713/2 |
| 2015/0281954 A1* | 10/2015 | Warren | H04W 12/04 | 713/171 |

* cited by examiner

F I G. 2
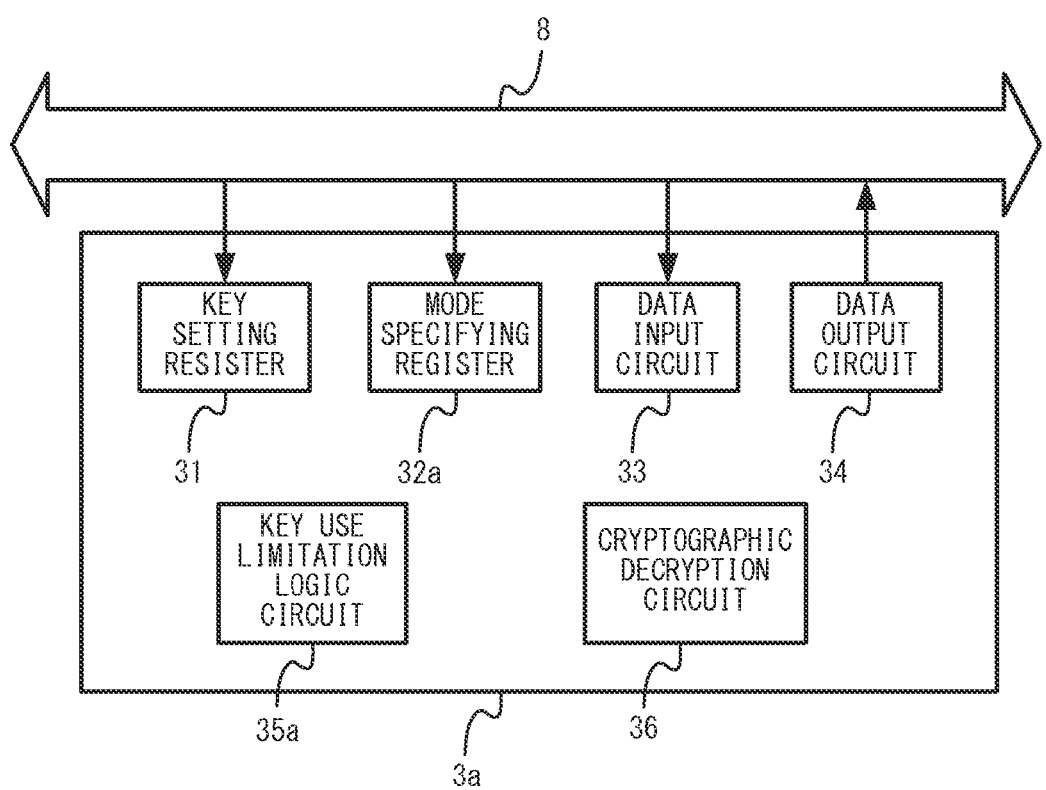

F I G. 4
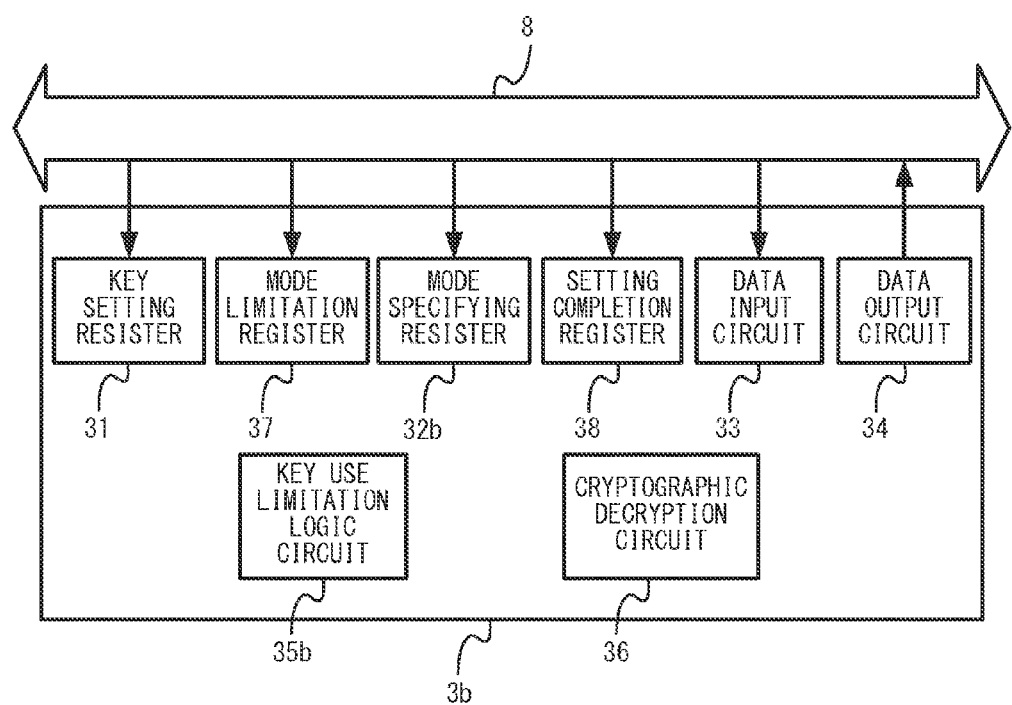

CRYPTOGRAPHIC PROCESSING APPARATUS, CRYPTOGRAPHIC PROCESSING SYSTEM, AND CRYPTOGRAPHIC PROCESSING METHOD

CROSS REFERENCE TO RELATED APPLICATION

The disclosure of Japanese Patent Application No. 2014-92865, filed on Apr. 28, 2014, is incorporated herein by reference.

FIELD

The technology shown here relates to a cryptographic processing apparatus, a cryptographic processing system, and a cryptographic processing method, and in particular, relates to a cryptographic processing apparatus, a cryptographic processing system, and a cryptographic processing method that, for example, are capable of encrypting and decrypting data.

BACKGROUND AND SUMMARY

Conventionally, there is an apparatus for performing encryption and decryption using a cryptographic key. For example, if a program to be encrypted is falsified, the apparatus makes it impossible for the program to be encrypted, thereby preventing unauthorized encryption.

However, a further improvement of security is demanded, and therefore, a new technique for improving security is needed.

Therefore, it is an object of an exemplary embodiment to provide a novel cryptographic processing apparatus, a novel cryptographic processing system, and a novel cryptographic processing method.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of a cryptographic processing apparatus according to an exemplary embodiment, a cryptographic processing apparatus encrypts and decrypts data. The cryptographic processing apparatus includes a key data storage area, a mode setting circuit, and a process limitation circuit. In the key data storage area, a plurality of pieces of key data used for encryption and/or decryption are stored. The mode setting circuit sets, for at least one of the plurality of pieces of key data stored in the key data storage area, a process mode of either of an encryption process and a decryption process in association with the key data. The process limitation circuit receives a mode specifying command for specifying a process mode in association with key data from another apparatus, and if the received process mode and the process mode associated with the key data set in the mode setting circuit coincide with each other, permits the process in the process mode using the key data.

Based on the above, a process mode of either of an encryption process and a decryption process is set in association with at least one piece of key data. Thus, it is possible to achieve a novel cryptographic process for limiting a process mode using the key data to one of the encryption process and the decryption process.

In addition, the key data associated with the process mode of either of the encryption process and the decryption process may be key data of a common key that can be used in the encryption process and the decryption process.

Based on the above, it is possible to achieve a novel cryptographic process for limiting a process mode using key data of a common key to one of the encryption process and the decryption process.

In addition, the key data may be written to the key data storage area when the cryptographic processing apparatus is started. The mode setting circuit may set a process mode corresponding to the written key data when the cryptographic processing apparatus is started.

Based on the above, key data and a process mode corresponding to the key data are set at the start. Thus, it is possible to prevent another apparatus from setting the key data and the process mode first, and perform a cryptographic process immediately after the start.

In addition, the key data may be written to the key data storage area by execution of secure system firmware. A process mode corresponding to the written key data may be set in the mode setting circuit by execution of the system firmware.

Based on the above, key data and a process mode corresponding to the key data are set by secure system firmware. Thus, it is possible to increase the security of the contents of the settings.

In addition, the system firmware may be a boot program stored in a boot ROM.

Based on the above, key data and a process mode corresponding to the key data are set by a boot program. Thus, it is possible to set the key data and the process mode at the start, and therefore possible to increase the security of the contents of the settings.

In addition, if the process mode specified by the received mode specifying command and the process mode set in the mode setting circuit do not coincide with each other, the process limitation circuit may erase the key data to be used in the process mode from the key data storage area.

Based on the above, the erasing of key data can prevent a process that is not permitted from being performed, using the key data.

In addition, if the process mode specified by the received mode specifying command and the process mode set in the mode setting circuit do not coincide with each other, the process limitation circuit may discard the mode specifying command.

Based on the above, it is possible to prohibit a process in a process mode that is not permitted.

In addition, the cryptographic processing apparatus may further include a dummy key data storage area. In the dummy key data storage area, dummy key data different from the plurality of pieces of key data is stored. In this case, if the process mode specified by the received mode specifying command and the process mode set in the mode setting circuit do not coincide with each other, the process limitation circuit may perform control for processing data in the process mode using the dummy key data in a processing circuit.

Based on the above, it is possible to prevent a process that is not permitted from being performed, using proper key data.

In addition, if the process mode specified by the received mode specifying command and the process mode set in the mode setting circuit do not coincide with each other, the process limitation circuit may refuse to receive data input to be processed in the process mode.

Based on the above, it is possible to prohibit input data from being processed in a process mode that is not permitted.

In addition, if the process mode specified by the received mode specifying command and the process mode set in the mode setting circuit do not coincide with each other, the process limitation circuit may output, as data processed in the process mode, data generated by a process different from the process of the processing mode.

Based on the above, it is possible to prevent proper data from being output in a process mode that is not permitted.

In another exemplary configuration of the cryptographic processing apparatus according to the exemplary embodiment, the cryptographic processing apparatus encrypts and decrypts data. The cryptographic processing apparatus includes a key data storage area, a mode setting circuit, and a process limitation circuit. In the key data storage area, key data used for encryption and/or decryption is stored. The mode setting circuit sets, for the key data stored in the key data storage area, a process mode of either of an encryption process and a decryption process in association with the key data. The process limitation circuit receives a mode specifying command for specifying a process mode from another apparatus, and if the received process mode and the process mode set in the mode setting circuit coincide with each other, permits the process in the process mode using the key data associated with the process mode.

Based on the above, a process mode of either of an encryption process and a decryption process is set in association with one piece of stored key data. Thus, it is possible to achieve a novel cryptographic process for limiting a process mode using the key data to one of the encryption process and the decryption process.

In addition, the exemplary embodiment may be carried out in the forms of a cryptographic processing system including the above circuits and a cryptographic processing method including operations performed by the above circuits.

According to the exemplary embodiment, a process mode of either of an encryption process and a decryption process is set in association with at least one piece of key data. Thus, it is possible to achieve a novel cryptographic process for limiting a process mode using the key data to one of the encryption process and the decryption process.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 2 is a block diagram showing a non-limiting example of cryptographic processing hardware 3a;

FIG. 4 is a block diagram showing a non-limiting example of cryptographic processing hardware 3b;

DETAILED DESCRIPTION OF NON-LIMITING EXAMPLE EMBODIMENTS

Figure 1:
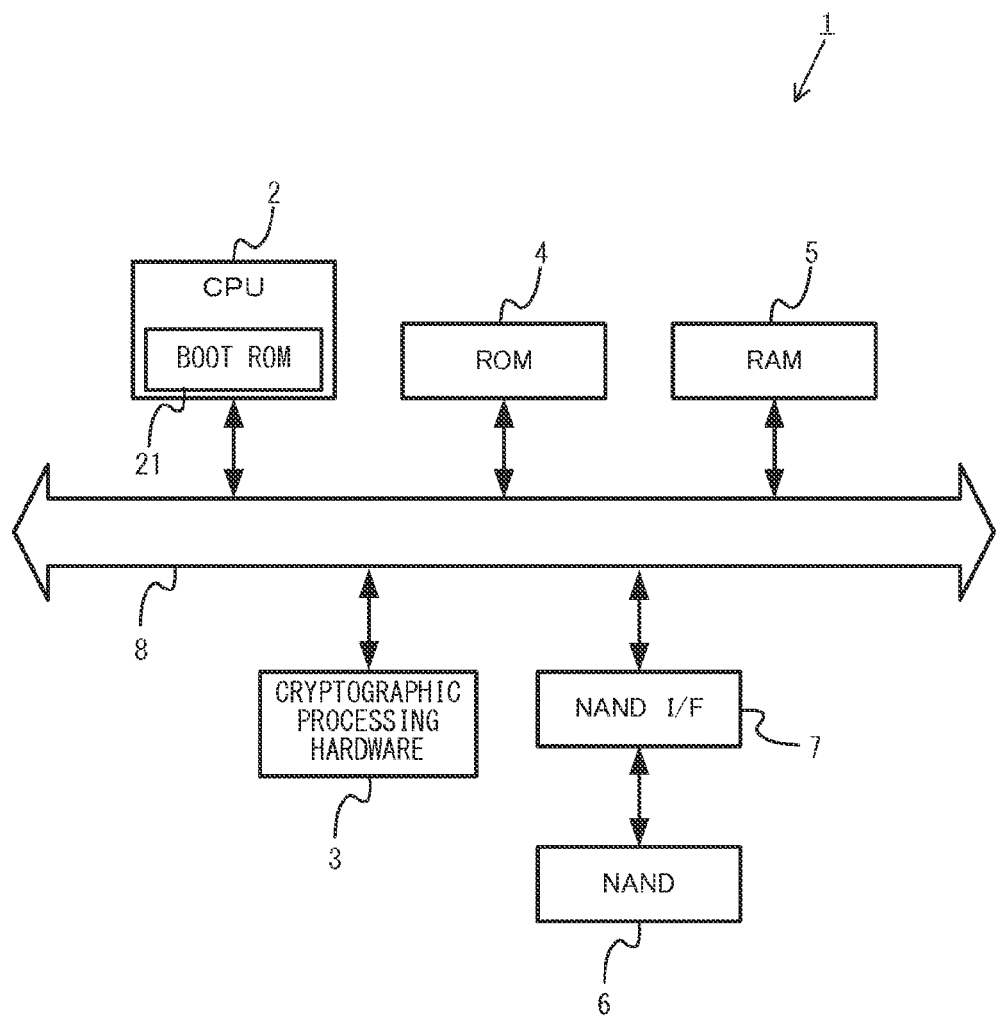
FIG. 1 is a block diagram showing a non-limiting example of a cryptographic processing system 1 including cryptographic processing hardware 3.

With reference to FIG. 1, a cryptographic processing system including a cryptographic processing apparatus according to an exemplary embodiment is described. It should be noted that FIG. 1 is a block diagram showing an example of a cryptographic processing system 1 including cryptographic processing hardware 3, which is an example of the cryptographic processing apparatus.

For example, the cryptographic processing system 1 is provided in an information processing apparatus. Here, the information processing apparatus including the cryptographic processing system 1 can execute a program stored in a storage medium such as an exchangeable memory card or an exchangeable optical disc, or received from a server or another game apparatus. Further, the information processing apparatus may be a handheld game apparatus, or may be a device such as a general personal computer, a mobile phone, or a PDA (Personal Digital Assistant). It should be noted that the information processing apparatus may include one or more apparatuses, and the cryptographic processing system 1 included in the information processing apparatus may be provided in a plurality of apparatuses in a dispersed manner.

The cryptographic processing system 1 is formed by connecting a CPU 2, the cryptographic processing hardware 3, a ROM 4, a RAM 5, a NAND flash memory 6, a NAND I/F 7, and the like via a bus 8. For example, the bus 8 is used to transmit data, a command, an address, and the like, and as an example, transmits various commands that the CPU 2 causes the components to execute.

The CPU 2 is an example of information processing means (a computer) for performing various types of information processing and includes a boot ROM 21 in the chip of the CPU 2. The CPU 2 has the function of performing, as one of the various types of information processing, the process of initializing the cryptographic processing hardware 3 using data set in the boot ROM 21, and the like. For example, the CPU 2 executes a predetermined program, thereby achieving the above function. Each of the ROM (Read-Only Memory) 4, the RAM (Random-Access Memory) 5, and the NAND flash memory 6 is a memory accessible by the CPU 2 via the bus 8 and/or the NAND I/F (interface) 7 and stores various types of data used by the CPU 2 when performing the above processing. It should be noted that the program to be executed by the CPU 2 may be stored in anything so long as it is a storage device (a storage medium) accessible by the CPU 2. For example, the program may be stored in the ROM 4 or the NAND memory 6. The program may be stored in a storage device provided in the information processing apparatus including the CPU 2, or may be stored in a storage medium detachably attached to the information processing apparatus including the CPU 2. Further, the program may be stored in a storage device (a server or the like) connected to the CPU 2 via a network. The CPU 2 may load a part or all of the program into the RAM 5 at appropriately timing and execute the loaded program.

Next, with reference to FIG. 2, a first example of the cryptographic processing hardware 3 (hereinafter, the cryptographic processing hardware 3 according to the first example will be designated by the numeral "3a") is described. It should be noted that FIG. 2 is a block diagram showing an example of cryptographic processing hardware 3a.

In FIG. 2, the cryptographic processing hardware 3a includes a key setting register 31, a mode specifying register 32a, a data input circuit 33, a data output circuit 34, a key use limitation logic circuit 35a, and a cryptographic decryption circuit 36. The cryptographic processing hardware 3a functions as a cryptographic processing apparatus for encrypting and/or decrypting input data using, for example, a common key cryptosystem. For example, the cryptographic processing hardware 3a can perform encryption and/or decryption using an AES (Advanced Encryption Standard) cryptosystem, and as examples, operates in a CBC (Cipher Block Chaining) operation mode, a CTR (Counter) operation mode, an ECB (Electronic Codebook) operation mode, a CFB (Cipher Feedback) operation mode, an OFB (Output Feedback) operation mode, and the like. It should be noted that the cryptographic processing hardware 3a is not limited to an AES cryptosystem, but may be a cryptographic processing apparatus for performing encryption and/or decryption data using another encryption scheme.

The key setting register 31 holds at least one piece of cryptographic key data (one piece of cryptographic key data in the first example). The key setting register 31 includes an access limitation circuit which any software can write to but cannot read from. Then, the key setting register 31 holds cryptographic key data written by secure software, which is automatically executed when the cryptographic processing system 1 is started. Here, the secure software is system firmware in which the plaintext of a program cannot be derived or falsified, unlike a general application program. Examples of the secure software include a boot program, firmware, a kernel, and the like. In the exemplary embodiment, the boot program is stored in the boot ROM 21, and the firmware and the kernel are stored in the NAND memory 6. It should be noted that the cryptographic key data held in the key setting register 31 may be cryptographic type data that is a type for generating cryptographic key data.

The mode specifying register 32a holds data representing the use of the cryptographic key data held in the key setting register 31 (for example, one of an encryption process mode and a decryption process mode). For example, in a first example, even if the cryptographic key data written in the key setting register 31 is so-called common key data, which can be used in either of the encryption process mode and the decryption process mode, the use of the cryptographic key data is limited to either one of the encryption process mode and the decryption process mode. Then, data representing the limitation of the process mode of the cryptographic key data written in the key setting register 31 (for example, a numerical value data indicating whether the use of the cryptographic key data is limited to the encryption process mode or limited to the decryption process mode) is written to the mode specifying register 32a by the secure software automatically executed when the cryptographic processing system 1 is started. Further, if another apparatus performs a process in a process mode different from the process mode already set in the mode specifying register 32a, using the cryptographic processing hardware 3a, the other apparatus changes the data to data corresponding to a process mode for requesting the data held in the mode specifying register 32a.

The data input circuit 33 functions as input means for receiving data transmitted from another apparatus to the cryptographic processing hardware 3a to be encrypted or decrypted, and inputting the data to the cryptographic processing hardware 3a. The data output circuit 34 functions as output means for outputting data processed by the cryptographic processing hardware 3a to another apparatus.

The key use limitation logic circuit 35a limits the use of the cryptographic key data held in the key setting register 31 in accordance with the set process mode. For example, in the first example, in accordance with a change in the data held in the mode specifying register 32a, the key use limitation logic circuit 35a erases from the key setting register 31 the cryptographic key data of which the use is limited by the held data. As an example, in the state where the use of the cryptographic key data held in the key setting register 31 is limited to the decryption process mode, if another apparatus has attempted to use the cryptographic key data in the encryption process mode, the other apparatus changes the data held in the mode specifying register 32a (that is, the data representing the decryption process mode) to data corresponding to the encryption process mode. In this case, the key use limitation logic circuit 35a erases from the key setting register 31 the cryptographic key data that the other apparatus is attempting to use. Consequently, the other apparatus cannot use the cryptographic key data held in the key setting register 31 in the encryption process mode, and therefore, as a result, the use of the cryptographic key data is limited to the decryption process mode even if the cryptographic key data is common key data.

The cryptographic decryption circuit 36 encrypts or decrypts data input to the data input circuit 33 and outputs the processed data to the data output circuit 34. For example, the cryptographic decryption circuit 36 processes input data in the process mode held in the mode specifying register 32a, using the cryptographic key data held in the key setting register 31, and outputs the processed data. It should be noted that if the cryptographic key data corresponding to the process mode held in the mode specifying register 32a has been erased from the key setting register 31, the cryptographic decryption circuit 36 may process input data in the process mode using predetermined key data (for example, key data having a numerical value of 0), or may output the input data as it is as output data.

Figure 3:
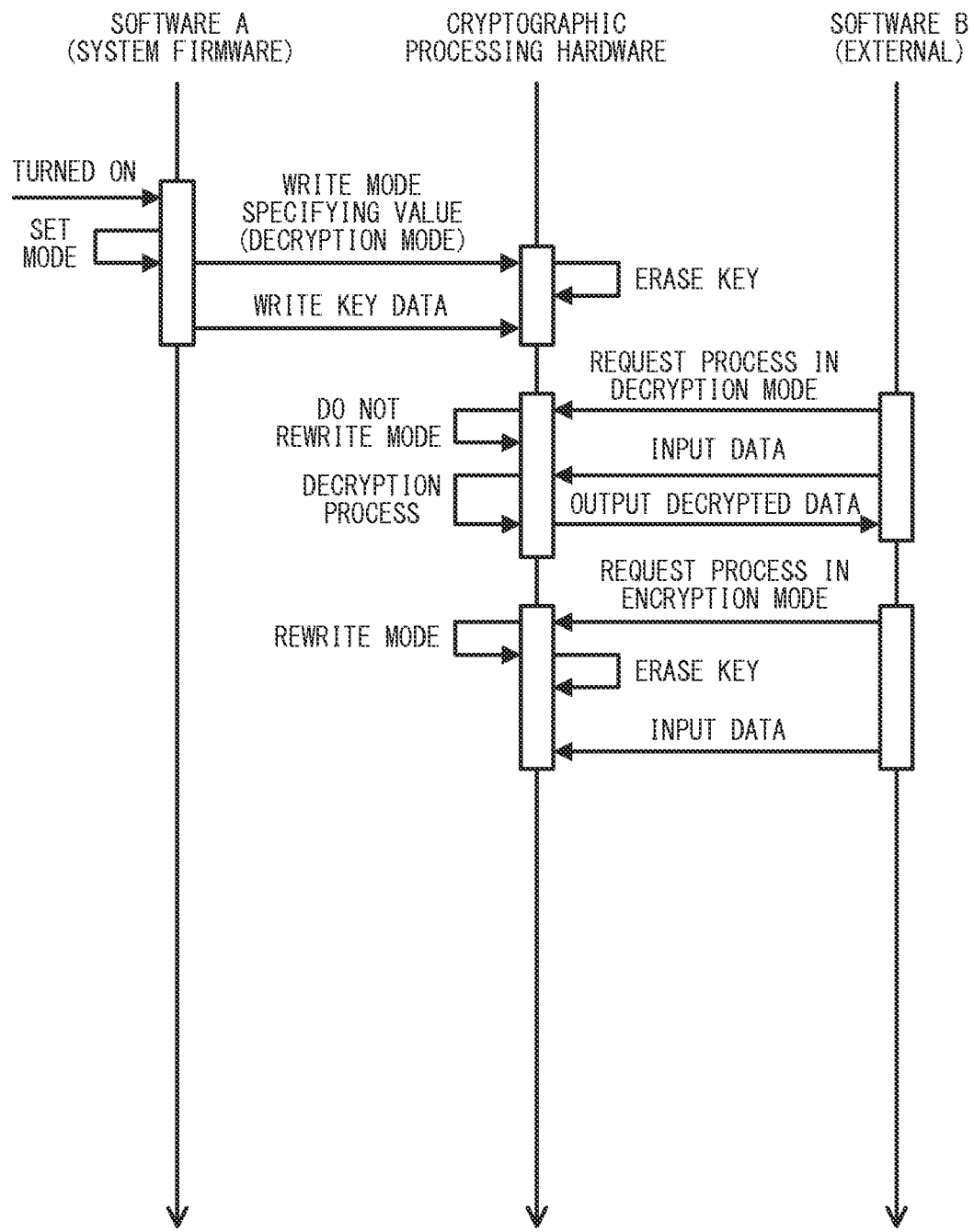
FIG. 3 is a chronological diagram showing a non-limiting example of the operation of the cryptographic processing system 1 including the cryptographic processing hardware 3a in a first example.

Next, with reference to FIG. 3, a description is given of an example of an overview of the operation performed in the cryptographic processing system 1 including the cryptographic processing hardware 3a in the first example. It should be noted that FIG. 3 is a chronological diagram showing an example of the operation performed in the cryptographic processing system 1 in the first example.

Referring to FIG. 3, if the cryptographic processing system 1 has been turned on, software A sets a process mode for permitting a process using the cryptographic processing hardware 3a. For example, the software A is system firmware, which is an example of the secure software. As an example, the software A is software that cannot be accessed by another piece of software. The software A is a boot program stored in the boot ROM 21 provided in the chip of the CPU 2. For example, the boot program is software automatically executed by the CPU 2 when the cryptographic processing system 1 is started.

Next, the software A writes a mode specifying value to the mode specifying register 32a and limits a process mode of which the process can be performed by the cryptographic processing hardware 3a. For example, the software A writes a mode specifying value indicating the decryption process mode to the mode specifying register 32a and limits a process mode of which the process can be performed by the cryptographic processing hardware 3a to the decryption process mode.

If a new mode specifying value has been written to the mode specifying register 32a, the key use limitation logic circuit 35a erases the cryptographic key data held in the key setting register 31. The mode specifying register 32a is configured to be written by any software. However, if a new mode specifying value has been written, or if a written value has been changed, the key use limitation logic circuit 35a erases the cryptographic key data held in the key setting register 31.

Next, the software A writes, to the key setting register 31, cryptographic key data to be used in the process mode of which the process is to be performed by the cryptographic processing hardware 3a (for example, the decryption process mode). Consequently, when the cryptographic processing system 1 is turned on, cryptographic key data and a limited process mode of which the process can be performed using the cryptographic key data are set in the cryptographic processing hardware 3a.

A case is described where with cryptographic key data and a limited process mode set as described above, an external apparatus (software B) placed outside the cryptographic processing hardware 3a makes a process request to the cryptographic processing system 1 in the first example.

For example, if the software B makes a process request to perform the process in the limited process mode set in the cryptographic processing hardware 3a (for example, the decryption process mode), the cryptographic processing hardware 3a acquires from the software B a mode specifying command for specifying the process mode in association with cryptographic key data. For example, the cryptographic processing hardware 3a acquires from the software B a command for writing the mode specifying value indicating the decryption process mode to the mode specifying register 32a. In response to this, the mode specifying value indicating the decryption process mode is already set in the mode specifying register 32a. Thus, it is not necessary to rewrite the mode specifying register 32a, and therefore, the key use limitation logic circuit 35a maintains the cryptographic key data held in the key setting register 31. Then, if input data to be subjected to the decryption process has been input from the software B to the data input circuit 33, the cryptographic decryption circuit 36 performs the decryption process on the input data using the cryptographic key data held in the key setting register 31. Then, the decrypted data is output to the software B via the data output circuit 34.

On the other hand, also if the software B makes a request to perform the process in a process mode different from the limited process mode set in the cryptographic processing hardware 3a (for example, the encryption process mode), the cryptographic processing hardware 3a acquires from the software B a mode specifying command for specifying the process mode in association with cryptographic key data. For example, the cryptographic processing hardware 3a acquires from the software B a command for writing the mode specifying value indicating the encryption process mode to the mode specifying register 32a. In response to this, the mode specifying value indicating the decryption process mode is already set in the mode specifying register 32a. Thus, the mode specifying register 32a is rewritten with the mode specifying value indicating the encryption process mode. Thus, the key use limitation logic circuit 35a erases the cryptographic key data held in the key setting register 31 in accordance with the fact that the mode specifying value set in the mode specifying register 32a is rewritten. Then, if input data to be subjected to the encryption process has been input from the software B to the data input circuit 33, the cryptographic decryption circuit 36 performs the encryption process on the input data using, for example, predetermined key data (for example, key data having a numerical value of 0), and outputs the input data. Then, the data output from the cryptographic decryption circuit 36 is output to the software B via the data output circuit 34.

As described above, when the process in a process mode different from the limited process mode set in the cryptographic processing hardware 3a has been requested by an external apparatus and if a mode specifying value for requesting the process has been set in the mode specifying register 32a, cryptographic key data required for the process is erased. Thus, it is not possible to change the initialized process mode while maintaining the cryptographic key data. Further, the cryptographic key data cannot be read from the key setting register 31. Further, software other than the software A does not know the cryptographic key data. Thus, once the cryptographic key data has been erased from the key setting register 31, correct cryptographic key data cannot be reset. As described above, a process mode (for example, either of the encryption process mode and the decryption process mode) is set in association with cryptographic key data, whereby it is possible to prevent the abuse of the cryptographic key data set by the software A.

It should be noted that in the above first example of the cryptographic processing hardware 3, a case has been described where the key setting register 31 holds one piece of cryptographic key data. Alternatively, the key setting register 31 may hold a plurality of pieces of cryptographic key data. For example, it is possible to hold cryptographic key data for each use of data to be encrypted and/or decrypted (for example, hard disk data, game program data, saving data, SD memory card data, optical disc data, memory card data, NAND data, or the like), each cryptosystem, or each operation mode (for example, the CBC operation mode, the CTR operation mode, the ECB operation mode, the CFB operation mode, or the OFB operation mode). In this case, a mode specifying register is provided in the cryptographic processing hardware 3a for each piece of cryptographic key data held in the key setting register 31, and each of the plurality of pieces of cryptographic key data is set in the corresponding mode specifying register in association with a process mode (for example, either of the encryption process mode and the decryption process mode). Further, if a mode specifying command for specifying a process mode in association with cryptographic key data has been acquired from an external apparatus (the software B), a key number setting register for specifying the cryptographic key data indicated by the mode specifying command is provided in the cryptographic processing hardware 3a, and the above operation is performed on a set of the cryptographic key data corresponding to the specified number and the mode specifying register. This makes it possible to similarly prevent the abuse of cryptographic key data also when a plurality of pieces of cryptographic key data are held.

Next, with reference to FIG. 4, a second example of the cryptographic processing hardware 3 (hereinafter, the cryptographic processing hardware 3 according to the second example will be designated by the numeral "3b") is described. It should be noted that FIG. 4 is a block diagram showing an example of cryptographic processing hardware 3b.

In FIG. 4, the cryptographic processing hardware 3b includes a key setting register 31, a mode specifying register 32b, a data input circuit 33, a data output circuit 34, a key use limitation logic circuit 35b, a cryptographic decryption circuit 36, a mode limitation register 37, and a setting completion register 38. Similarly to the cryptographic processing hardware 3a, the cryptographic processing hardware 3b functions as a cryptographic processing apparatus for encrypting and/or decrypting input data using, for example, a common key cryptosystem. It should be noted that an example of a cryptosystem by which the cryptographic processing hardware 3b can perform a process is similar to that of the cryptographic processing hardware 3a, and therefore is not described in detail here. Further, the key setting register 31, the data input circuit 33, the data output circuit 34, and the cryptographic decryption circuit 36, which are provided in the cryptographic processing hardware 3b, are also similar to those of the cryptographic processing hardware 3a. Thus, these components are designated by the same numerals, and are not described in detail here.

The mode specifying register 32b holds a mode specifying value indicating a process mode requested by an external apparatus. For example, also in the second example, the cryptographic key data written in the key setting register 31 can be used in either of the encryption process mode and the decryption process mode. The use of even so-called common key data is limited to either one of the encryption process mode and the decryption process mode. In the second example, however, a mode specifying value is not written to the mode specifying register 32b by the secure software, but a mode specifying value indicating a process mode for which a process request has been made is written in accordance with the process request.

The mode limitation register 37 holds data representing a mode limitation value for limiting the use of the cryptographic key data held in the key setting register 31 (for example, one of the encryption process mode and the decryption process mode). Data representing the limitation of the process mode of the cryptographic key data written in the key setting register 31 (for example, data indicating whether the use of the cryptographic key data is limited to the encryption process mode or limited to the decryption process mode) is written to the mode limitation register 37 by the secure software automatically executed when the cryptographic processing system 1 is started.

The setting completion register 38 limits writing to the mode limitation register 37. For example, if data meaning that a setting has not been completed (for example, data representing a numerical value of 0) is written in the setting completion register 38, it is possible to write to the mode limitation register 37. If, however, data meaning setting completion (for example, data representing a numerical value of 1) has been written to the setting completion register 38, it is not possible to write to the mode limitation register 37 after that. Then, the setting completion register 38 is configured such that if data meaning setting completion has been written, the setting completion cannot be cancelled.

The key use limitation logic circuit 35b limits the use of the cryptographic key data held in the key setting register 31 to the process mode set in the mode limitation register 37. For example, in the second example, if the process in the process mode indicated by the mode limitation value has been requested, the key use limitation logic circuit 35b enables the specifying of the mode in the mode specifying register 32b. Specifically, the key use limitation logic circuit 35b limits a process mode to be enabled so as to correspond to the mode specifying value written in the mode specifying register 32b, to the process mode indicated by the mode limitation value held in the mode limitation register 37. Thus, only the process mode of the mode limitation value held in the mode limitation register 37 can be enabled by the external apparatus. Thus, the use of the cryptographic key data is limited to the process mode indicated by the mode limitation value even if the cryptographic key data is common key data.

Figure 5:
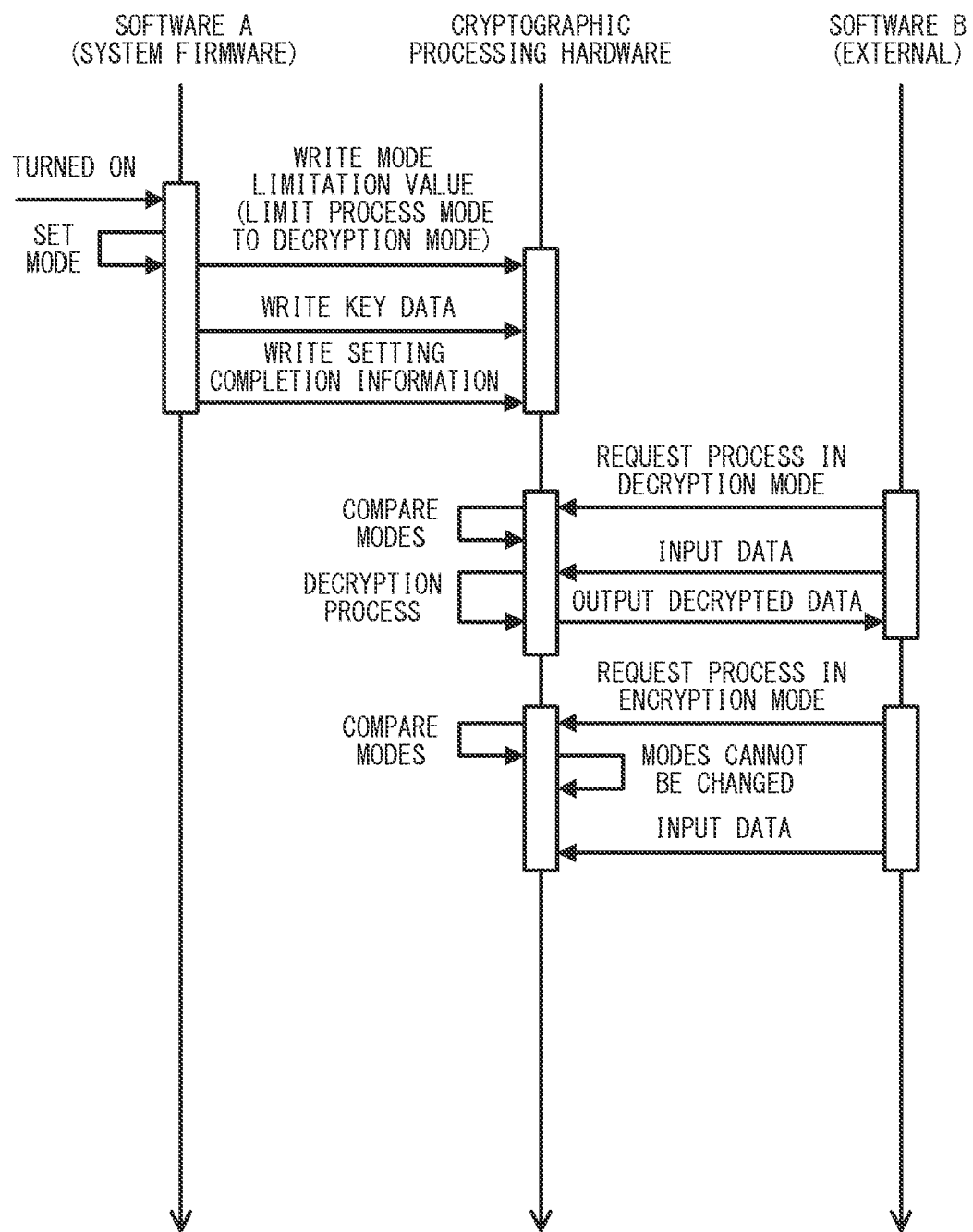
FIG. 5 is a chronological diagram showing a non-limiting example of the operation of the cryptographic processing system 1 including the cryptographic processing hardware 3b in a second example.

Next, with reference to FIG. 5, a description is given of an example of an overview of the operation performed in the cryptographic processing system 1 including the cryptographic processing hardware 3b in the second example. It should be noted that FIG. 5 is a chronological diagram showing an example of the operation performed in the cryptographic processing system 1 including the cryptographic processing hardware 3b in the second example.

Referring to FIG. 5, if the cryptographic processing system 1 has been turned on, software A sets a process mode for permitting a process using the cryptographic processing hardware 3b. For example, the software A is system firmware, which is an example of the secure software. As an example, the software A is software that cannot be accessed by another piece of software. The software A is a boot program stored in the boot ROM 21 provided in the chip of the CPU 2. For example, the boot program is software automatically executed by the CPU 2 when the cryptographic processing system 1 is started.

Next, the software A writes a mode limitation value to the mode limitation register 37 and limits a process mode of which the process can be performed by the cryptographic processing hardware 3b. For example, the software A writes a mode limitation value indicating the decryption process mode to the mode limitation register 37 and limits a process mode of which the process can be performed by the cryptographic processing hardware 3b to the decryption process mode. Further, the software A writes, to the key setting register 31, cryptographic key data to be used in the process mode of which the process is to be performed by the cryptographic processing hardware 3b (for example, the decryption process mode).

Then, the software A writes data meaning setting completion to the setting completion register 38 so that the it is not possible to write to the mode limitation register 37. As a result of these operations, when the cryptographic processing system 1 is turned on, cryptographic key data and a limited process mode of which the process can be performed using the cryptographic key data are set in the cryptographic processing hardware 3b so that the setting of the process mode cannot be changed.

A case is described where with cryptographic key data and a limited process mode set as described above, an external apparatus (software B) makes a process request to the cryptographic processing system 1 in the second example.

For example, if the software B makes a process request to perform the process in the limited process mode set in the cryptographic processing hardware 3b (for example, the decryption process mode), the cryptographic processing hardware 3b acquires from the software B a mode specifying command for specifying the process mode in association with cryptographic key data. For example, a mode specifying value indicating the decryption process mode is written to the mode specifying register 32a of the cryptographic processing hardware 3b by the software B. In response to this, the key use limitation logic circuit 35b compares the process mode set in the mode limitation register 37 with the process mode set in the mode specifying register 32b. If both modes coincide with each other (that is, the process mode for which the process request has been made is the limited process mode of which the process can be performed), the specifying of the process mode set in the mode specifying register 32b is enabled. In the process request, the process mode set in the mode specifying register 32b is the same as the decryption process mode set in the mode limitation register 37. Thus, the key use limitation logic circuit 35b permits the decryption process using the cryptographic key data held in the key setting register 31 in accordance with the process request. Then, if input data to be subjected to the decryption process has been input from the software B to the data input circuit 33, the cryptographic decryption circuit 36 performs the decryption process on the input data using the cryptographic key data held in the key setting register 31. Then, the decrypted data is output to the software B via the data output circuit 34.

On the other hand, also if the software B makes a process request to perform the process in a process mode different from the limited process mode set in the cryptographic processing hardware 3b (for example, the encryption process mode), the cryptographic processing hardware 3b acquires from the software B a mode specifying command for specifying the process mode in association with cryptographic key data. For example, a mode specifying value indicating the encryption process mode is written to the mode specifying register 32a of the cryptographic processing hardware 3b by the software B. In response to this, the key use limitation logic circuit 35b compares the process mode set in the mode limitation register 37 with the process mode set in the mode specifying register 32b. If both modes do not coincide with each other (that is, the process mode for which the process request has been made is not the limited process mode of which the process can be performed), the specifying of the process mode set in the mode specifying register 32b is disabled (modes are not changed). In the process request, the process mode set in the mode specifying register 32b is different from the decryption process mode set in the mode limitation register 37. Thus, the key use limitation logic circuit 35b does not permit the encryption process corresponding to the process request. Thus, even if input data to be subjected to the encryption process has been input from the software B to the data input circuit 33, the cryptographic decryption circuit 36 does not perform the encryption process on the input data.

As described above, if the process in a process mode different from the limited process mode set in the cryptographic processing hardware 3b has been requested by an external apparatus, the process based on the setting of the mode specifying value for requesting the process in the mode specifying register 32b is not enabled, and therefore, modes cannot be changed. Thus, it is not possible to perform the requested process. Further, the cryptographic key data cannot be read from the key setting register 31, either. As described above, a process mode (for example, either of the encryption process mode and the decryption process mode) is set in association with cryptographic key data, whereby it is possible to prevent the abuse of the cryptographic key data set by the software A.

It should be noted that in the above second example of the cryptographic processing hardware 3, a case has been described where the key setting register 31 holds one piece of cryptographic key data. Alternatively, the key setting register 31 may hold a plurality of pieces of cryptographic key data. For example, similarly to the first example, it is possible to hold cryptographic key data for each use of data to be encrypted and/or decrypted (for example, hard disk data, game program data, saving data, SD memory card data, optical disc data, memory card data, NAND data, or the like), each cryptosystem, or each operation mode (for example, the CBC operation mode, the CTR operation mode, the ECB operation mode, the CFB operation mode, or the OFB operation mode). In this case, a mode limitation register is provided in the cryptographic processing hardware 3b for each piece of cryptographic key data held in the key setting register 31, and each of the plurality of pieces of cryptographic key data is set in the corresponding mode limitation register in association with a process mode (for example, either of the encryption process mode and the decryption process mode). Further, if a mode specifying command for specifying a process mode in association with cryptographic key data has been acquired from an external apparatus (the software B), a key number setting register for specifying the cryptographic key data indicated by the mode specifying command is provided in the cryptographic processing hardware 3b, and the operation is performed of determining whether or not the process mode set in the mode specifying register 32b is to be enabled for a set of the cryptographic key data and the mode limitation register corresponding to the specified number. This makes it possible to similarly prevent the abuse of cryptographic key data also when a plurality of pieces of cryptographic key data are held.

In addition, in the above second example of the cryptographic processing hardware 3, the configuration is such that if the process in a process mode different from the limited process mode set in the cryptographic processing hardware 3b has been requested by an external apparatus, modes cannot be changed. Alternatively, the abuse of cryptographic key data may be prevented with another configuration. As an example, the process mode set in the mode limitation register 37 and the process mode set in the mode specifying register 32b may be compared with each other, and if both modes do not coincide with each other, the key use limitation logic circuit 35b may erase the cryptographic key data held in the key setting register 31. In this case, the cryptographic key data to be used in the process requested by the external apparatus is not held in the cryptographic processing hardware 3b. This makes it possible to prevent the abuse of the cryptographic key data.

As another example, dummy key data may be stored in advance in the cryptographic processing hardware 3b. Then, the process mode set in the mode limitation register 37 and the process mode set in the mode specifying register 32b may be compared with each other, and if both modes do not coincide with each other, the key use limitation logic circuit 35b may switch the cryptographic key data held in the key setting register 31 to the dummy key data. In this case, the cryptographic key data to be used in the process requested by the external apparatus is switched to the dummy key data, and the process is performed. Thus, it is not possible to obtain a proper process result. This makes it possible to prevent the abuse of the cryptographic key data. It should be noted that the dummy key data may be stored in the cryptographic processing hardware 3b in accordance with the execution of the boot program, or may be written at the time of manufacture of the cryptographic processing hardware 3b.

As yet another example, the process mode set in the mode limitation register 37 and the process mode set in the mode specifying register 32b may be compared with each other, and if both modes do not coincide with each other, the key use limitation logic circuit 35b may perform control so that data input to the data input circuit 33 is not received. In this case, even if the external apparatus (the software B) has input data for making a process request to the data input circuit 33, the input data is not received. This makes it possible to prevent the abuse of the cryptographic key data held in the key setting register 31.

As yet another example, the process mode set in the mode limitation register 37 and the process mode set in the mode specifying register 32b may be compared with each other, and if both modes do not coincide with each other, the key use limitation logic circuit 35b may perform control so that data output from the data output circuit 34 has a fixed value (for example, 0) set in advance. In this case, even if the external apparatus (the software B) has input data for making a process request to the data input circuit 33, data having the fixed value is always output from the data output circuit 34. This makes it possible to prevent the abuse of the cryptographic key data held in the key setting register 31.

In addition, in the above first and second examples of the cryptographic processing hardware 3, a process mode for permitting a process is set in the mode specifying register 32a or the mode limitation register 37. However, it goes without saying that a process mode for prohibiting a process may be set in the mode specifying register 32*a* or the mode limitation register 37.

In addition, in the above first and second examples of the cryptographic processing hardware 3, an example has been used where cryptographic key data is set in association with a process mode. Alternatively, cryptographic key data may be set in association with another piece of information. For example, cryptographic key data to be used in the combination of an operation mode for performing encryption and/or decryption (for example, the CBC operation mode, the CTR operation mode, the ECB operation mode, the CFB operation mode, or the OFB operation mode) and a process mode for permitting a process in the operation mode (for example, either of the encryption process mode and the decryption process mode) may be set, and based on data that represents an operation mode and a process mode and has been acquired from an external apparatus, it may be determined whether or not it is possible to use cryptographic key data.

In addition, in the above first and second examples of the cryptographic processing hardware 3, an example has been used where the setting of cryptographic key data and the setting of a process mode for permitting a process are made by the secure software automatically executed when the cryptographic processing system 1 is started. The settings, however, may not be made when the cryptographic processing system 1 is started. The settings may be made at predetermined timing after the cryptographic processing system 1 is started so long as the settings are made by the secure software.

In addition, in the above description, means for controlling cryptographic processing (the cryptographic processing hardware 3) has been configured by hardware such as circuits and registers, but may be configured by so-called software. For example, the means for controlling cryptographic processing may be configured by means including a control section (CPU) for executing a program for achieving the above cryptographic processing operations. In this case, the program may be supplied to the cryptographic processing system 1 not only through an external storage medium such as an external memory, but also through a wired or wireless communication link. Further, the program may be stored in advance in a non-volatile storage device included in the cryptographic processing system 1. It should be noted that examples of an information storage medium having stored therein the program may include CD-ROMs, DVDs, optical disc storage media similar to these, flexible disks, hard disks, magneto-optical discs, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

In addition, the above process of performing encryption and/or decryption by the cryptographic processing hardware 3 is effective, for example, in achieving an application executable only by a particular type of apparatus. For example, to achieve a game program executable only by a particular game apparatus, it is possible to generate a game program that can be decrypted only by the game apparatus. As an example, a game program generation apparatus generates a game program encrypted using cryptographic key data A, which is a common key. In this case, only a game apparatus capable of performing a decryption process using the cryptographic key data A can decrypt and execute the game program. The game program generation apparatus can generate a game program executable by a particular game apparatus. If, however, another apparatus different from the game program generation apparatus can perform an encryption process using the cryptographic key data A, the other apparatus can generate an original game program. However, in an apparatus other than the game program generation apparatus, an operation mode using the cryptographic key data A is limited to the decryption process mode. This makes it possible to prevent the generation of an original game program.

As another example where such an effect is obtained, it is possible to control a password set in an apparatus operated by a user. In a system using the password control, if the user has forgotten the password used in the apparatus operated by the user (a user terminal apparatus), it is possible to receive a master code that substitutes for the password from support that manages an application using the password and the like.

Figure 6:
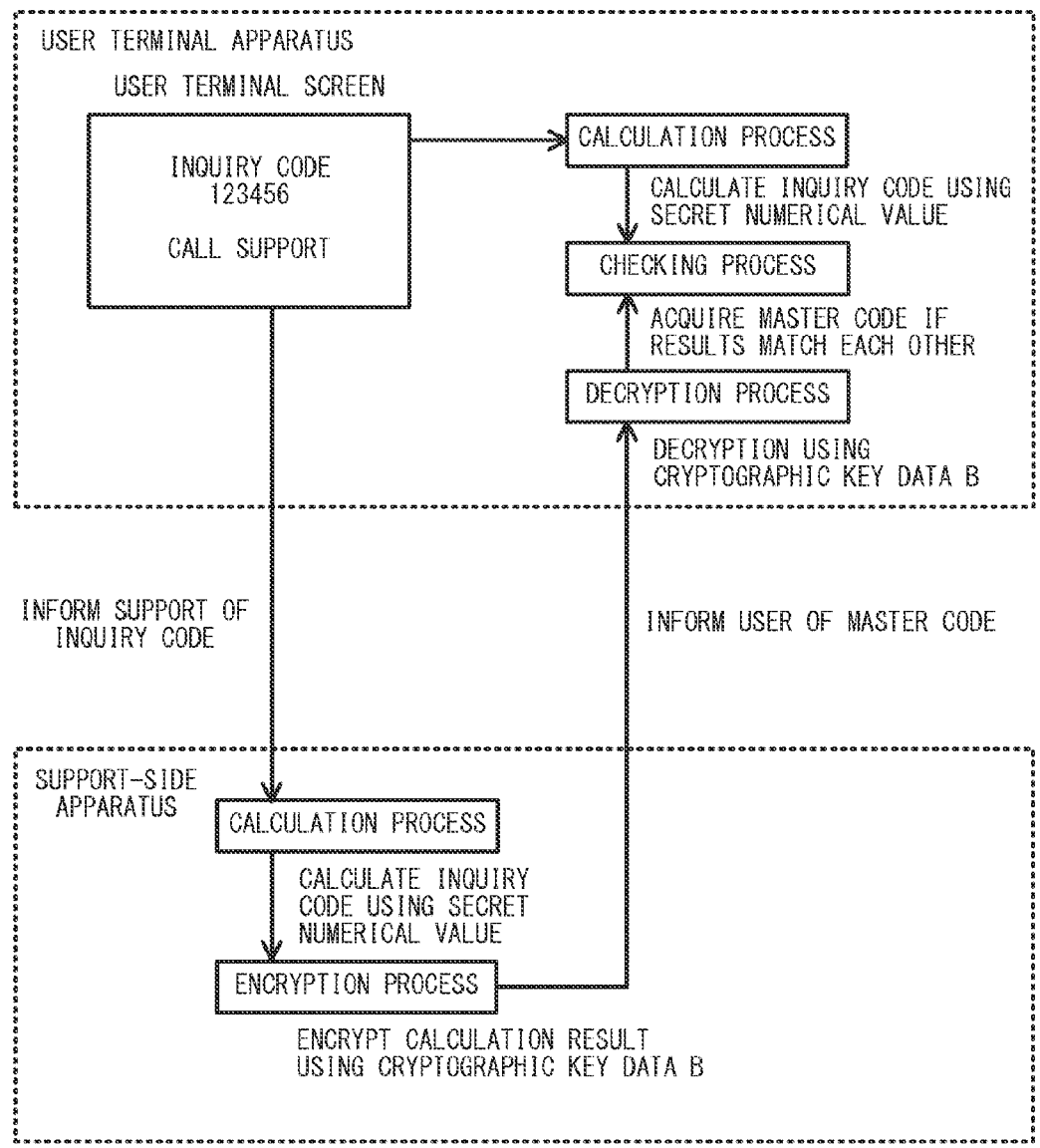
FIG. 6 is a diagram showing a non-limiting example of an overview of a password control system.

For example, as shown in FIG. 6, if the user has forgotten a password required to execute an application in the user terminal apparatus, a predetermined operation is performed, thereby displaying on a screen a text image representing an inquiry code (for example, an inquiry code 123456), and also displaying on the screen an image for prompting the user to inform the support of the inquiry code. Then, the user informs the support of the inquiry code by telephone or email and waits for the support to inform the user of a master code.

A support-side apparatus performs a calculation process for calculating the inquiry code that the support has been informed of, using a secret numerical value. Next, the support-side apparatus performs an encryption process on the calculation process result using cryptographic key data B and calculates a master code (for example, a master code ABCDE). Then, the support having been informed of the inquiry code by the user informs the user of the calculated master code.

The user having been informed of the master code inputs the master code to the user terminal apparatus. In accordance with the input of the master code, the user terminal apparatus decrypts the master code using the same cryptographic key data B (that is, a common key) as that used by the support-side apparatus. Further, the user terminal apparatus performs a calculation process (typically, the same calculation process as the calculation performed by the support-side apparatus) for calculating an inquiry code generated in accordance with the predetermined operation, using a secret numerical value stored in advance in the user terminal apparatus (typically, the same numerical value as the secret numerical value used by the support-side apparatus). Then, a checking process for checking the master code decrypted by the decryption process against the result of the calculation process of the user terminal apparatus is performed, and if both process results match each other, the decryption process result is acquired as a new password.

In the above password control, an inquiry code is displayed, and a new password can be acquired only by a user terminal apparatus capable of performing a decryption process using the cryptographic key data B. Further, a master code on which the new password is based can be generated only by an apparatus in which a secret numerical value and a calculation method used in the calculation process are set and which can perform an encryption process using the cryptographic key data B (that is, the support-side apparatus). If, however, another apparatus different from the support-side apparatus can perform an encryption process using the cryptographic key data B, it is possible to generate a master code only by analogizing the secret numerical value and the calculation method used in the calculation process. In an apparatus other than the support-side apparatus, however, an operation mode using the cryptographic key data B is limited to the decryption process mode. This makes it possible to prevent another apparatus from generating a master code.

In addition, the above description has been given of an operation in the case where one piece of cryptographic processing hardware 3 performs a cryptographic decryption process. Alternatively, at least some of the operations of the cryptographic decryption process may be performed by another apparatus. For example, if the cryptographic processing system 1 is configured to communicate with another apparatus (for example, another server, another game apparatus, or another mobile terminal), the other apparatus may cooperate to perform each operation of the cryptographic decryption process. As described above, at least some of the operations of the cryptographic decryption process is performed by another apparatus, whereby it is possible to perform a process similar to the cryptographic decryption process described above.

Here, the above variations make it possible to achieve the exemplary embodiment also by a system form such as cloud computing, or a system form such as a distributed wide area network or a local area network. For example, in a system form such as a distributed local area network, it is possible to execute the above processing between a stationary information processing apparatus (a stationary game apparatus) and a handheld information processing apparatus (a handheld game apparatus) by the cooperation of the apparatuses. It should be noted that, in these system forms, there is no particular limitation on which apparatus performs the above operations. Thus, it goes without saying that it is possible to achieve the exemplary embodiment by sharing the operations in any manner.

In addition, the processing orders, the setting values, the conditions used in the determinations, and the like that are used in the cryptographic decryption process described above are merely illustrative. Thus, it goes without saying that the exemplary embodiment can be achieved also with other orders, other values, and other conditions.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as a novel cryptographic processing apparatus, a novel cryptographic processing system, a novel cryptographic processing method, and the like.

What is claimed is:

1. A cryptographic processing apparatus for encrypting and decrypting data, the cryptographic processing apparatus comprising:
   a key data storage area storing a plurality of pieces of key data used for encryption and/or decryption;
   a mode setting circuit configured to set, for at least one of the plurality of pieces of key data stored in the key data storage area, a process mode of either of an encryption process or a decryption process in association with the stored at least one key data; and
   a process limitation circuit operable to:
      receive a mode specifying command specifying a process mode of either an encryption process or a decryption process in association with key data from another apparatus;
      compare the process mode specified by the mode specifying command to the process mode associated with the stored at least one key data;
      when, based on the compare, the received process mode specified by the mode specifying command and the process mode associated with the stored at least one key data set in the mode setting circuit are determined to coincide with each other, permit performing a process corresponding to the process mode specified by the mode specifying command using the stored at least one key data; and
      when, based on the compare, the process mode specified by the mode specifying command and the process mode associated with the stored at least one key data set in the mode setting circuit are determined to not coincide with each other, prevent performing the process corresponding to the process mode specified by the mode specifying command using the stored at least one key data.

2. The cryptographic processing apparatus according to claim 1, wherein
   the at least one key data associated with the process mode of either of the encryption process or the decryption process is key data of a common key that can be used in the encryption process and the decryption process.

3. The cryptographic processing apparatus according to claim 1, wherein
   the at least one key data is written to the key data storage area when the cryptographic processing apparatus is started, and
   the mode setting circuit sets a process mode corresponding to the written key data when the cryptographic processing apparatus is started.

4. The cryptographic processing apparatus according to claim 1, wherein
   the at least one key data is written to the key data storage area by execution of secure system firmware, and
   a process mode corresponding to the written key data is set in the mode setting circuit by execution of the system firmware.

5. The cryptographic processing apparatus according to claim 4, wherein
   the system firmware is a boot program stored in a boot ROM.

6. The cryptographic processing apparatus according to claim 1, wherein
   if the process mode specified by the received mode specifying command and the process mode set in the mode setting circuit do not coincide with each other, the process limitation circuit erases the key data to be used in the process mode from the key data storage area.

7. The cryptographic processing apparatus according to claim 1, wherein
if the process mode specified by the received mode specifying command and the process mode set in the mode setting circuit do not coincide with each other, the process limitation circuit discards the mode specifying command.

8. The cryptographic processing apparatus according to claim 1, further comprising a dummy key data storage area configured to store dummy key data different from the plurality of pieces of key data, wherein
if the process mode specified by the received mode specifying command and the process mode set in the mode setting circuit do not coincide with each other, the process limitation circuit performs control for processing data in the process mode using the dummy key data in a processing circuit.

9. The cryptographic processing apparatus according to claim 1, wherein
if the process mode specified by the received mode specifying command and the process mode set in the mode setting circuit do not coincide with each other, the process limitation circuit refuses to receive data input to be processed in the process mode.

10. The cryptographic processing apparatus according to claim 1, wherein
if the process mode specified by the received mode specifying command and the process mode set in the mode setting circuit do not coincide with each other, the process limitation circuit outputs, as data processed in the process mode, data generated by a process different from the process of the processing mode.

11. A cryptographic processing apparatus for encrypting and decrypting data, the cryptographic processing apparatus comprising:
a key data storage area storing key data used for encryption and/or decryption;
a mode setting circuit operable to set, for at least one of the key data stored in the key data storage area, a process mode of either of an encryption process or a decryption process in association with the at least one key data; and
a process limitation circuit operable to:
receive a mode specifying command specifying a process mode of either an encryption process or a decryption process from another apparatus;
compare the process mode specified by the mode specifying command to the process mode associated with the stored at least one key data;
when, based on the compare, the process mode specified by the mode specifying command and the process mode set in the mode setting circuit are determined to coincide with each other, permit performing a process corresponding to the process mode specified by the mode specifying command using the stored at least one key data associated with the process mode; and
when, based on the compare, the process mode specified by the mode specifying command and the process mode set in the mode setting circuit are determined to not coincide with each other, prevent performing the process corresponding to the process mode specified by the mode specifying command using the stored at least one key data associated with the process mode.

12. A cryptographic processing system including a cryptographic processing apparatus for encrypting and decrypting data and system firmware for controlling the cryptographic processing apparatus, the cryptographic processing apparatus comprising:
a key data storage area storing a plurality of pieces of key data used for encryption and/or decryption are written by the system firmware;
a mode setting circuit setting, for at least one of the plurality of pieces of key data stored in the key data storage area, a process mode of either of an encryption process or a decryption process in association with the at least one key data; and
a process limitation circuit operable to:
receive a mode specifying command specifying a process mode of either an encryption process or a decryption process in association with key data from another apparatus;
compare the process mode specified by the mode specifying command to the process mode associated with the stored at least one key data;
when, based on the compare, the process mode specified by the mode specifying command and the process mode associated with the stored at least one key data set in the mode setting circuit are determined to coincide with each other, permit performing a process corresponding to the process mode specified by the mode specifying command using the stored at least one key data; and
when, based on the compare, the process mode specified by the mode specifying command and the process mode associated with the stored at least one key data set in the mode setting circuit are determined to not coincide with each other, prevent performing the process corresponding to the process mode specified by the mode specifying command using the stored at least one key data.

13. A cryptographic processing method for encrypting and decrypting data, the cryptographic processing method comprising:
storing in a storage area a plurality of pieces of key data used for encryption and/or decryption;
setting, for at least one of the plurality of pieces of key data stored in the storage area, a process mode of either of an encryption process or a decryption process in association with the stored at least one key data; and
receiving a mode specifying command specifying a process mode of either an encryption process or a decryption process in association with key data from another apparatus;
compare the process mode specified by the mode specifying command to the process mode associated with the stored at least one key data;
when, based on the compare, the process mode specified by the mode specifying command and the process mode associated with the stored at least one key data set in the setting in association with the key data are determined to coincide with each other, permitting performing a process corresponding to the process mode specified by the mode specifying command using the stored at least one key data; and
when, based on the compare, the process mode specified by the mode specifying command and the process mode associated with the stored at least one key data set in the setting in association with the key data are determined to not coincide with each other, preventing performing the process corresponding to the process mode specified by the mode specifying command using the stored at least one key data.

* * * * *